US006816974B1

(12) United States Patent
Nurmi et al.

(10) Patent No.: US 6,816,974 B1
(45) Date of Patent: Nov. 9, 2004

(54) METHOD AND ARRANGEMENT FOR LIMITING THE USE OF A DISPLAY DEVICE

(75) Inventors: Juha Nurmi, Salo (FI); Kimmo Siitari, Salo (FI); Pertti Saarinen, Salo (FI)

(73) Assignee: Nokia Display Products Oy, Salo (FI)

( * ) Notice: Subject to any disclaimer, the term of this patent is extended or adjusted under 35 U.S.C. 154(b) by 0 days.

(21) Appl. No.: 09/439,803

(22) Filed: Nov. 12, 1999

(30) Foreign Application Priority Data

Nov. 11, 1998 (FI) ........................................ 982445

(51) Int. Cl.[7] ........................................ H04L 9/32

(52) U.S. Cl. ........................ 713/202; 380/52; 713/194; 248/553

(58) Field of Search ........................ 713/202, 200, 713/310, 194, 330; 710/15, 17; 248/553; 340/568.3; 361/679, 747; 380/52

(56) References Cited

U.S. PATENT DOCUMENTS 4,494,114 A 1/1985 Kaish
5,353,219 A * 10/1994 Mueller et al. ............... 705/16
5,623,637 A * 4/1997 Jones et al. ................. 711/164
5,675,321 A * 10/1997 McBride .................. 340/568.2
5,821,868 A 10/1998 Kühling
5,935,244 A * 8/1999 Swamy et al. .............. 713/200
6,131,130 A * 10/2000 Van Ryzin ..................... 710/6

FOREIGN PATENT DOCUMENTS

GB 2320397 6/1998

OTHER PUBLICATIONS

Patent Abstracts of Japan 09027087, Jan. 28, 1997 for Japanese Patent Application 07–177259, filed Jul. 13, 1995.

* cited by examiner

*Primary Examiner*—Kim Vu
*Assistant Examiner*—Paula Klimach

(57) ABSTRACT

Use of an especially small-sized and valuable display device (b 31) is limited to persons knowing a password, not by any requirement that a password (33) always be entered when the display device (31) is switched on, but rather detecting, the detachment of the display device (31) from the equipment (35–39) controlling it and measuring its time of being detached, for limiting the use of the display device (31) on the basis of a certain predetermined and adjustable time limit which, when exceeded, requires the password be entered.

23 Claims, 5 Drawing Sheets

PRIOR ART

METHOD AND ARRANGEMENT FOR LIMITING THE USE OF A DISPLAY DEVICE

BACKGROUND OF THE INVENTION

1. Technical Field

The invention relates to preventing the unauthorized use of a device comprising a display, especially a valuable computer display, such as a flat display device.

2. Discussion of Related Art

Thefts of personal computer equipment constitute a significant problem, because especially the new flat display devices are light, small and valuable. Mechanical means for preventing thefts include, for instance, fastening the devices with wire ropes, but this method is clumsy and not even very efficient, because wire ropes can be cut by equipment generally used by thieves. The solutions presented in the following are electric means for preventing the theft or unauthorized use of the device.

Protection against theft of personal computers connected to a Local Area Network (LAN) is known from the patent specification JP-09027087. In this solution, the devices form a closed circuit, the breaking of which causes the alarm to go off. If the device is stolen in spite of the alarm, information of this is transmitted to the theft notification device via the telephone line.

In another well-known method a password is requested always when the device is switched on in mobile stations and car radios. There is also a method used in computers, in which password request is activated when the display device is switched to a display saving mode.

The known solutions have the problem that the arrangement is unpractical or complicated. The problem in the password-requesting systems is a frequent need to enter the password. The known electric solutions have the drawback that the display device is not protected, because usually only the use of information in the computer is restricted.

SUMMARY OF INVENTION

It is the object of the invention to provide a solution for limiting the use of the display device, which solution does not require entering the password every time when the display device is switched to the normal operating mode, but which protects especially the display device and does not only prevent the use of the processor unit of the computer.

The invention relates to a method for limiting the use of a display device, which display device is detachable from the equipment that controls it. In accordance with the invention, the detachment of the display device is examined and the length of time during which the display device is detached is measured, in order to limit the use of the display device on the basis of a certain predetermined time limit.

The invention also relates to an arrangement for limiting the use of a display device, which display device is detachable from the equipment that controls it. The arrangement in accordance with the invention comprises a detachment detector for examining the detachment of the display device and for measuring the period of time during which the display device is detached, for limiting the use of the display device on the basis of a certain predetermined time limit.

The invention also relates to a display device which can be detached from the equipment controlling the display device, and which comprises means for limiting the use of the display device. In accordance with the invention, the display device comprises

- a coupling for connecting the display device to the equipment controlling the display device,
- a detector circuit for detecting the detachment of the processor unit,
- a line connection from the processor unit for entering information, such as a password,
- a processor for controlling the prevention mode on the basis of a signal given by the detector circuit,
- a display screen and controller for dealing with the prevention mode and the password, and
- a non-volatile memory for saving the password.

The activation of the prevention mode of the display device is based on the breaking of the electrical connection from the device environment. In accordance with the invention, the prevention mode is not activated if the connection is not broken for a certain period of time that can be set in advance, for example. In this way, the normal use of the display device is not made more difficult, but unauthorized use of the device is prevented in case of a theft, for example. The breaking of the connection takes place e.g. from a device that controls the display device, such as a processor unit, a Local Area Network (LAN) or a Wide Area Network (WAN). The activation of the prevention mode is primarily based on the state of a mechanical or electrical switch after detachment of the connection cable. An electric switch or a circuit which detects the detachment can react at least to a break in the electrical connection, the lack of a signal or the end of the connection in the local area network.

The invention can also be applied to a display device connected wirelessly and equipped with a circuit which detects a break in the wireless connection. A wireless connection like this is, for example, an Infra Red (IR) or Radio Frequency (RF) link. The connection break is recognized by monitoring the traffic between the display device and the use environment, the ending of which or the lack of a signal is a criterion for recognizing a break.

The circuit which detects the detachment in accordance with the invention gives the processor of the display device information for locking the display device after a certain period from the detachment. This period of time can vary from a few seconds to days. During the time when the display device is locked, only a limited series of functions is operational, including at least the functions required for the request and entry of the password. The request for password takes place in a small window on the display, for example, whereby the name and address of the owner can also be displayed. The passwords can include, at least, the password given by the user and/or a basic password possibly derived from the serial number, which can be solved by the maintenance service. In addition, the password can be saved in the memory as coded for high-level security. In this connection, high-level security means security which is especially difficult to break by criminal means. Consecutive trials of a password can be limited by a prevention period between password entries.

These and other objects, features and advantages of the present invention will become more apparent in light of the detailed description of a best mode embodiment thereof, as illustrated in the accompanying drawing.

BRIEF DESCRIPTION OF THE DRAWINGS

In the following, the invention will be described in more detail with reference to the accompanying drawing, in which

FIG. 1 shows a known arrangement for connecting a display device 1 and a processor unit 3. The arrangement comprises a display device 1, a display device connection cable 2, a processor unit 3, a keyboard connection cable 4, a keyboard 5, the power cable 6 of the processor unit 3 and the power cable 7 of the display device 1. In addition, the power cables 6, 7 are connected to the mains socket 8. The display device 1 displays a text 9 asking for the password 10 that authorizes the use of the computer.

When the display device is connected to the equipment, the emptying of the memory is stopped, and when the power is switched on 11, the process is started from the beginning of the flow chart 11.

Figure 1:
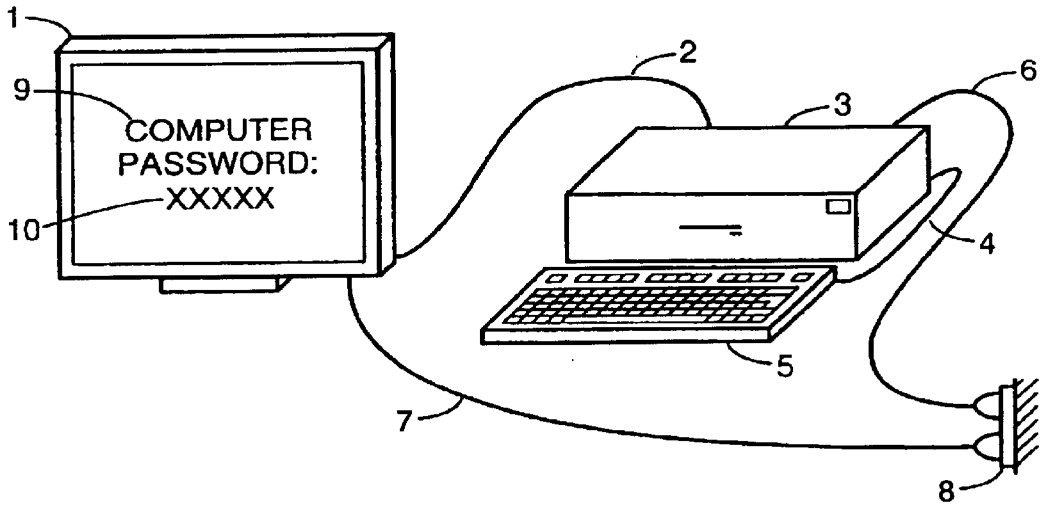
FIG. 1 shows a known arrangement for connecting a display device and processor unit of a computer, FIG. 2. shows a flow chart of a method according to the invention for limiting the use of the display device.
Figure 2:
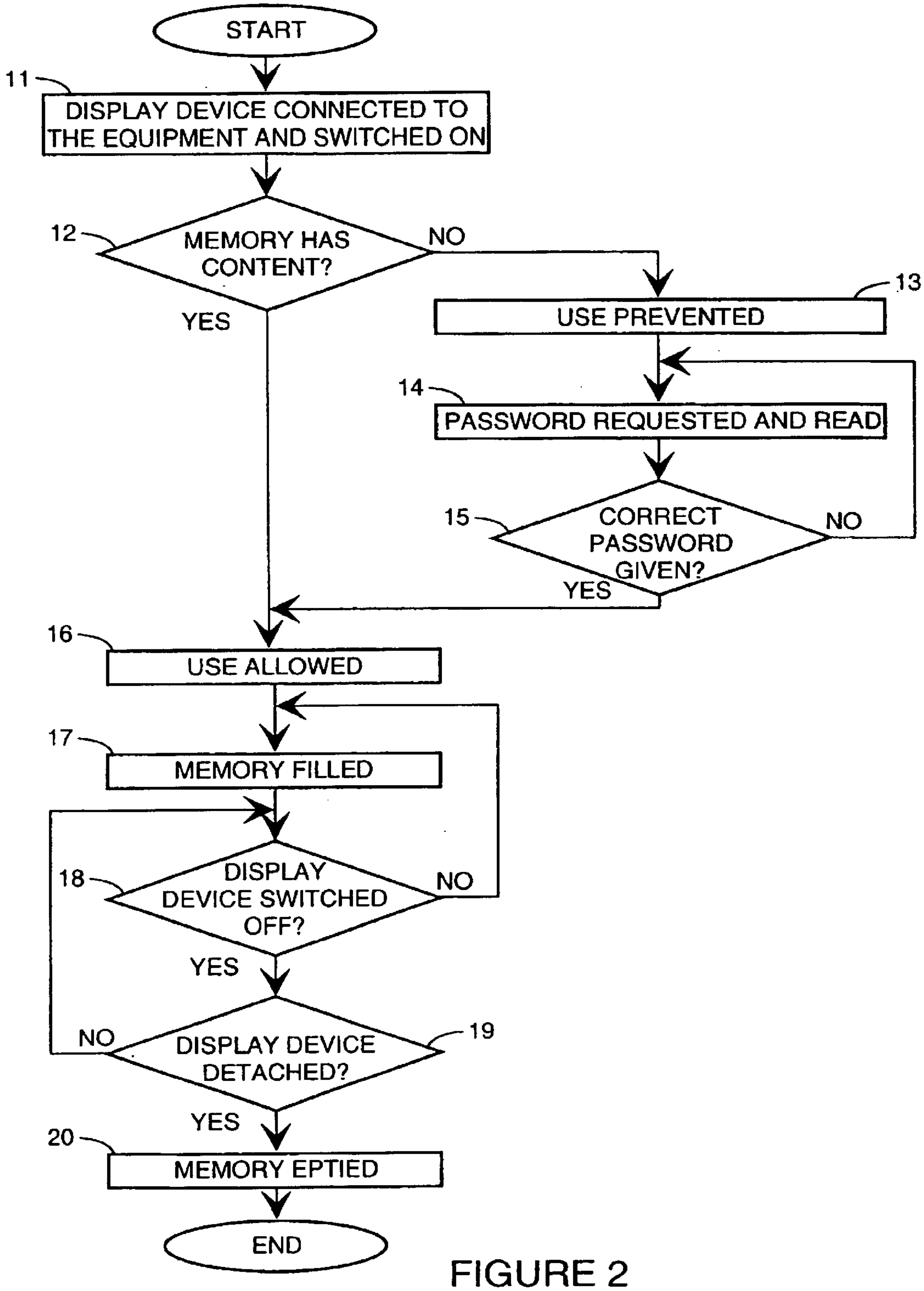
FIG. 2 shows a flow chart of a method according to the invention for limiting the use of a display device. The display device is connected to the equipment, and the operating voltage is switched on, as shown in a step 11. According to the content of the memory of the use prevention system, as shown in step 12 use is either prevented 13 or allowed 16. When the memory is empty, use is prevented 13 and the password is requested and read 14 until the correct password is entered 15, and use is allowed 16. If the memory still contains information, the process moves directly to allowing use 16. After this, the memory is filled 17 and filling is continued until the display device is switched off 18. After the switching off of the display device 18 it is examined 19 whether the display device is detached from the processor unit 3, and the process returns to examine 18 whether the display device is switched off, until the display device is both switched off 18 and detached 19, and the memory is emptied 20.
Figure 3:
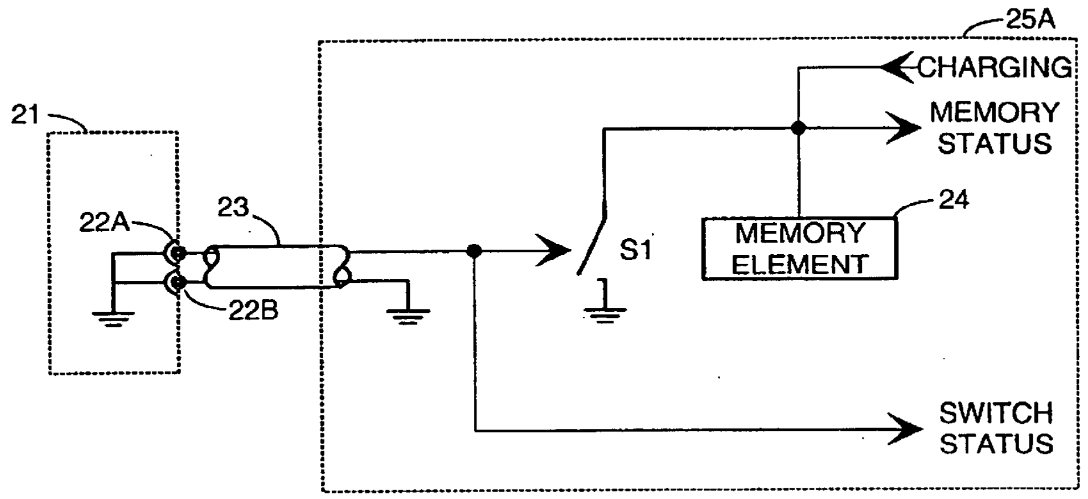
FIG. 3 shows schematically the principle of the arrangement according to the invention for limiting the use of a display device

FIG. 3 shows schematically the principle of an arrangement according to the invention for detecting the detachment of the display device 1 from the processor unit and for measuring the period of detachment for limiting the use of the display device. A connection unit 21 of the processor unit comprises a connector 22A for mating with a connector 22B of a connection cable 23 attached to the display device. The wires of the connector 22A used for limiting the use of the display device are grounded. The arrangement also comprises a switch S1 which reacts to the detachment of the connection cable 23 and a memory element 24, the filling status of which is also controlled by the switch S1. The status data of the switch S1 and the memory element 24 are transmitted to a processor (see FIG. 5) of the display device, which is used to control the charging of the memory element 24. The components of the display device which form the unit which detects the detachment of the display device are encircled by a broken line 25A.

When the operating voltage of the display device is switched on and the display device is connected to the connection unit 21 of the processor, information of the coupling is received by the signal SWITCH STATUS, and the memory element 24 is charged with the signal CHARGING. The switching off of the operating voltage causes a break in the charging, and the detachment of the display device from the processing unit causes a change of the status of the switch S1, whereby the memory element 24 is discharged to the ground. When the operating voltage has been switched on again, the status of the memory element 24 is examined with the signal MEMORY STATUS and the use of the display device is prevented or allowed correspondingly.

Figure 4:
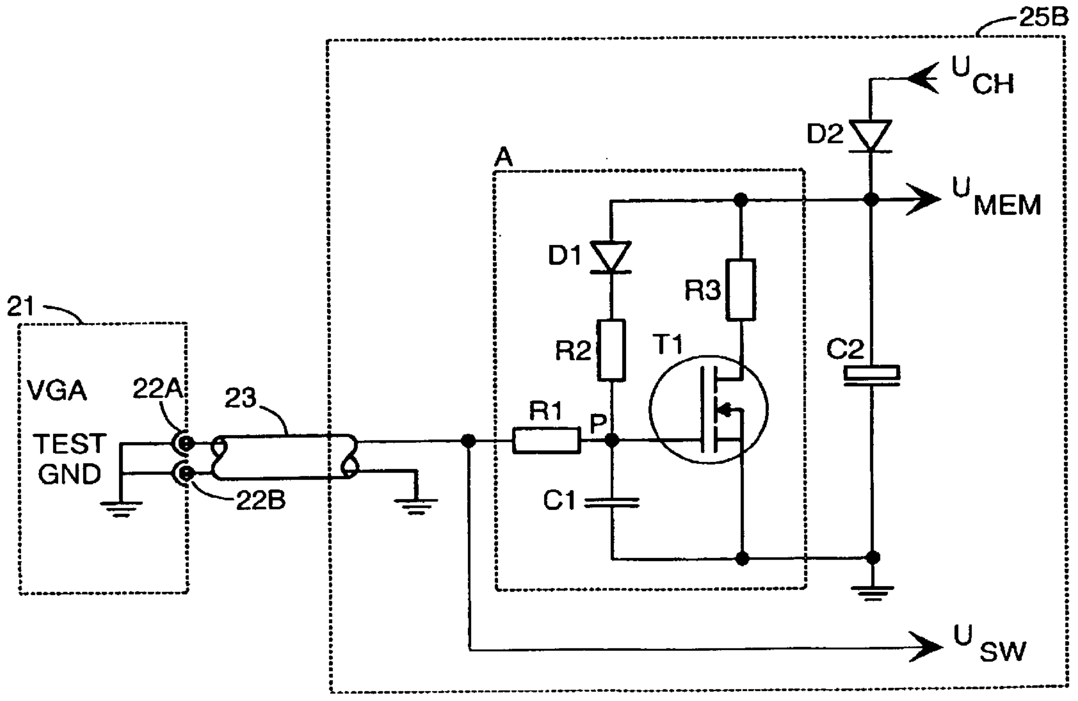
FIG. 4 shows a circuit diagram of an arrangement according to the invention for limiting the use of a display device.

FIG. 4 shows a circuit diagram of an arrangement according to the invention for detecting the detachment of the display device from the processor unit and measuring the period of detachment for limiting the use of the display device. The connection unit 21 of the processor unit 3 comprises a connector 22A for mating with the connector 22B of the connection cable 23 of the display device. In this case, VGA connectors are used, and the fifth wires (TEST) and grounding wires (GND) of the connector are used to limit the use of the display device. The TEST and GND wires of the connector 22A are grounded in the connection unit 21 of the processor unit. The arrangement also includes a connection A, delimited by a broken line, which corresponds to the switch S1 of FIG. 3, a capacitor C2 corresponding to the memory element 24, and a diode D2, which switches on the charging voltage $U_{CH}$. Due to the diode D2, the charging voltage $U_{CH}$ is switched to the capacitor C2 only when the loading voltage $U_{CH}$ exceeds the voltage of the capacitor. The coupling A includes a serial resistor R1, a capacitor C1 which saves the control of the switch status and a pull-up resistor R2 of the control point P and a diode D1 for controlling the switch transistor T1, and a pull-up resistor R3 for feeding a voltage to the switching transistor. Here the switching transistor is of the type MOSFET (Metal-Oxide Semiconductor Field Effect Transistor). The components that form the detector for detaching the display device are encircled by a broken line 25B.

When the operating voltage of the display device is switched on and the display device is connected to the connection unit 21 of the processor unit, information of the coupling is transmitted by the grounding of the voltage $U_{SW}$, and the memory capacitor C2 is charged with the voltage $U_{CH}$ through the forward diode D2. The switching off of the operating voltage causes an interruption of the charging and the prevention mode of the diode D2 i.e., it comes back biased because the memory capacitor C2 is charged while the charging voltage $U_{CH}$ is grounded to a zero value. The detachment of the display device from the processor unit causes switching of the status of the coupling A, whereby the memory capacitor C2 is discharged by the transistor T1 and the resistor R3 to the ground. When the operating voltage is switched on again, the status of the memory capacitor C2 is examined by measuring the voltage $U_{MEM}$. Use of the display device is prevented, if the voltage $U_{MEM}$ has fallen lower than a certain predetermined threshold value during the break.

Here the coupling A operates so that in a normal mode of operation, the channel of the switching transistor T1 remains open due to the grounding made at the connection unit 21 of the processor unit, as transmitted by the serial resistor R1, but when the processor unit 21 is detached, the voltage transmitted by the diode D1 and the resistor R2 from at least the memory capacitor C2 charges the capacitor C1 for closing the channel of the transistor T1, whereby the transistor T1 and the resistor R3 discharge the charge of the memory capacitor C2. Discharging takes place slowly. The time constant of the coupling of the resistor R3 and the memory capacitor C2 constitute the time when the prevention mode of the display device is activated. The diode D1 prevents the opening of the channel of the transistor T1 when the voltage of the memory capacitor C2 has fallen by means of the change of the voltage ratio to the reverse direction of the diode D1, when the control voltage of the switching transistor T1 is charged to the capacitor C1, which is connected to the grounding from the base of the switching transistor T1.

It should be realized that even thought only two wires are shown in cable 23 in FIGS. 3 and 4, a real connection cable of the display device would contain, for example, RGB (Red Green Blue) wires as well as others.

Figure 5:
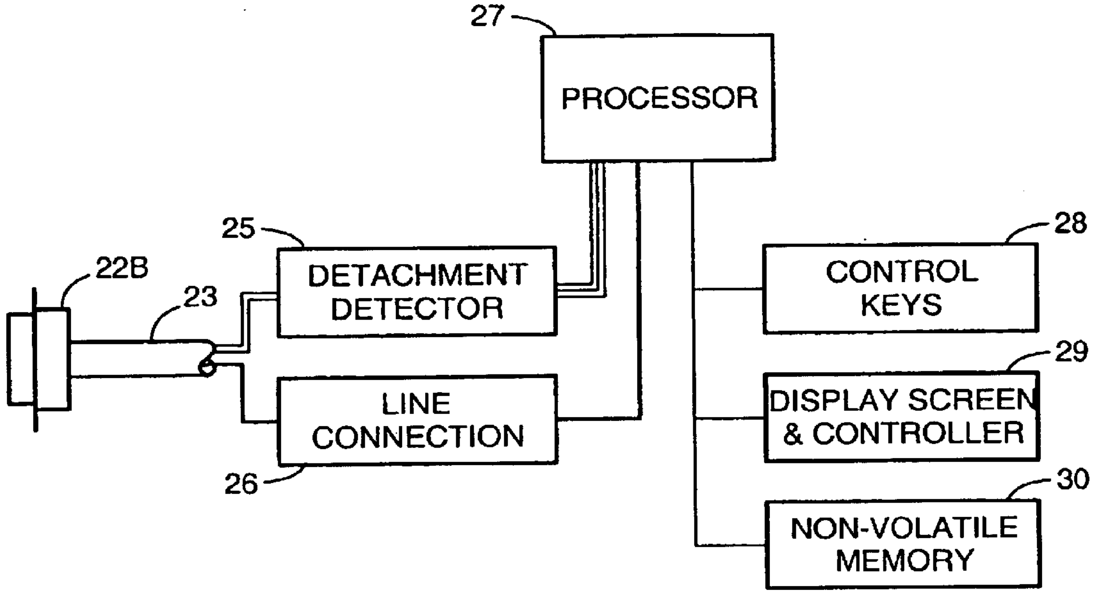
FIG. 5 shows a block diagram of the inventionally essential components of a display device according to the invention.

FIG. 5 shows a block diagram of the essential components of a display device in accordance with the invention for limiting the use of the display device. The display device comprises a connector 22B, a cable 23, a detector circuit 25 for detecting the detachment of the processor unit 21, a line connection 26 from the host processor unit 21 for feeding information, such as a password, a display processor 27, which controls the use limitation on the basis of information received from the detector circuit 25, a keyboard 28, a display screen and a controller 29 for controlling the prevention mode and the password, and a non-volatile memory 30 for saving the password. The non-volatile memory 30 can also be used for saving the user identification data, such as the name and address.

The password can be given from the processor unit by a line connection 26 or the control keys 28 of the display device. The control keys 28 of the display device are preferably ordinary display control keys, to which password handling functions have been added. Thus the password is given by selecting the desired letter from the list with the up and down arrow keys, for example.

Figure 6:
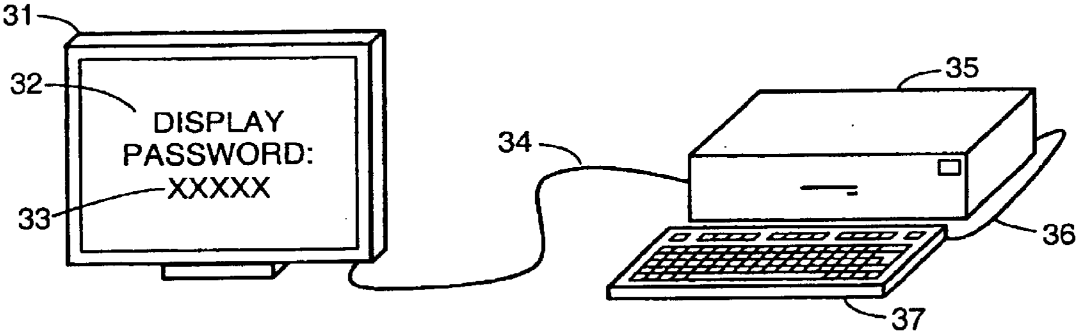
FIG. 6 shows an arrangement according to the invention for limiting the use of the display device.

FIG. 6 shows an arrangement according to the invention for limiting the use of the display device 31. The display password 33 is requested on the screen of the display device 31. The display device 31 is connected via a cable 34 to the processor unit 35 of the computer, and the wires of the connecting cable between the display device and the processor unit are arranged for the display device 31 according to the invention. There is also a keyboard 37 connected by a cable 36 to the processor unit 35 for the normal operation of the computer and for entering the password 33 of the display device 31.

Figure 7:
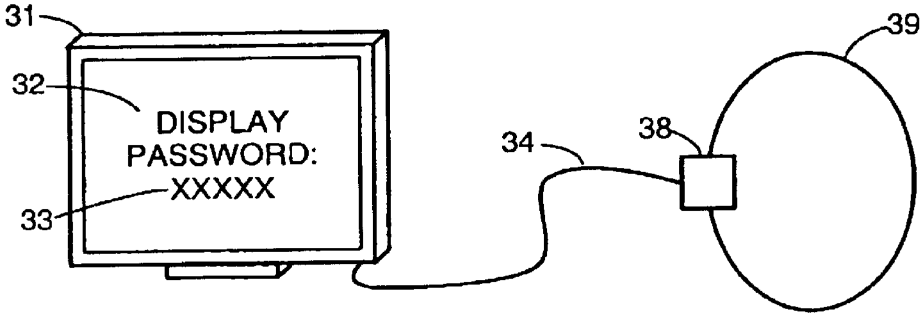
FIG. 7 shows another arrangement according to the invention for limiting the use of the display device.

FIG. 7 shows another arrangement according to the invention for limiting the use of the display device 31. The password for the display device is requested 32 on the screen of the display device 31. The display device 31 is connected by a cable 34 to the network adapter 38, and the wires of the connector of the connecting cable between the display device and the network adapter are arranged for the display device 31 according to the invention. The network adapter 38 is connected to a data network 39, which is a local-area network (LAN) or wide-area network (WAN), for example. The arrangement for limiting the use of the display device 31 bases in this preferred embodiment on the electrical connection to a data network 39. The arrangement may comprise means for detecting the presence of the network. The means for detecting the presence of the network can be based on the operation by means of which the display device can detect the data transfer in the network. If the data transfer is cut off, the means interpret this as a detachment and set the display device to another status. The status of the display device 31 depends on the time the network connection is cut off. If the display device 31 is connected back to the network in a certain time limit, the use of display device 31 can continue normally, but if the time limit is exceeded, the password is requested, as previously stated. To a man skilled in art it will be evident that the password can be entered to the display device 31 from the network. To a man skilled in the art it will also be evident that the limiting of the use of the display device 31 can also be based on a mechanical switch, which recognizes the detachment of the device from the network. The above described means for detecting the presence of the network can for example be a network presence detector.

Figure 8:
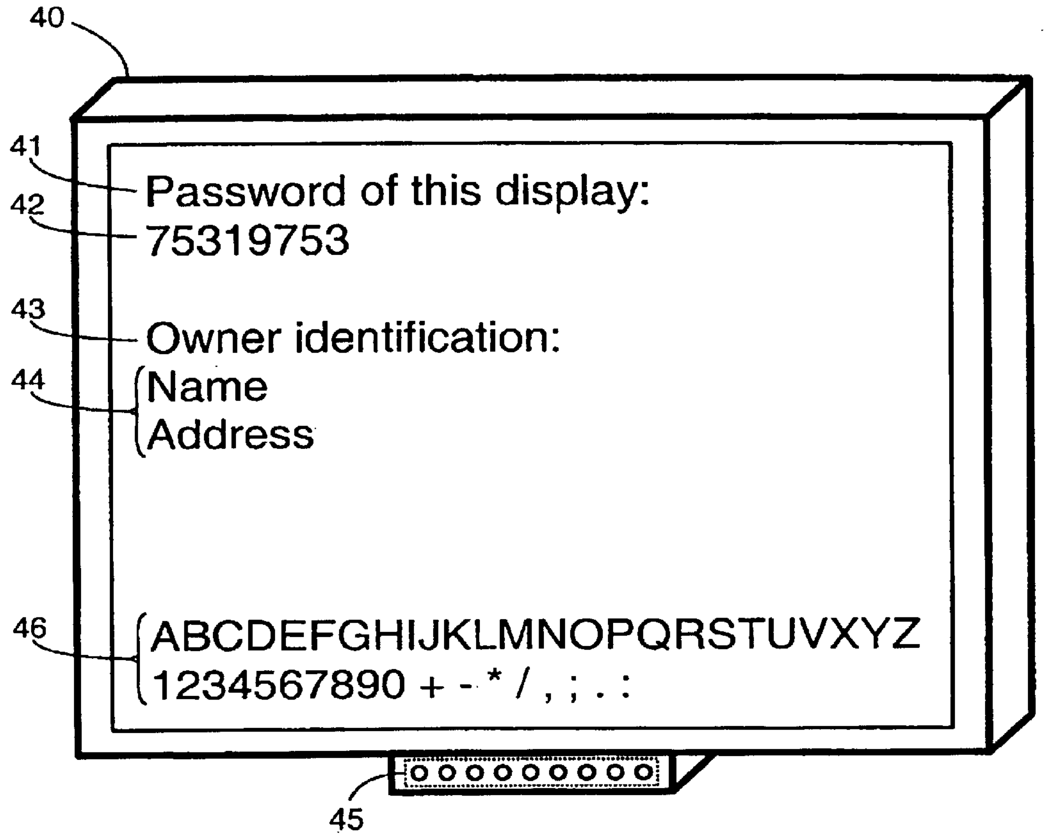
FIG. 8 shows a display device according to the invention.

FIG. 8 shows a display device 40 according to the invention. On the display device there is shown the request for a password 41 of the display device 40 and a covered password entry 42. Here the passwork 42 is the number 75319753. The password can be calculated by a secret version of a generally known cryptographic method. Thus the password cannot be solved by unauthorized users by examining the serial number. The calculation method is only entrusted to authorized parties, such as service companies. There is also shown the request for the owner information 43 of the display device 40 and the entered information 44. The owner's information 44 are here by way of example: Name, Address, Password 42 and owner's information 44 are entered by the control keys 45 of the display device by selecting the characters to be entered from the list 46. The list 46 comprises the following characters: "ABCDEFGHIJKLMNOPQRSTUVWXYZ1234567890+-*,,:".

Figure 9:
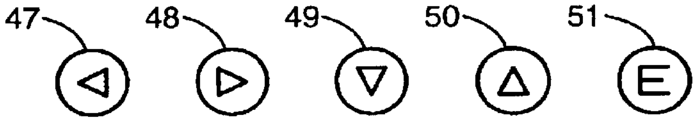
FIG. 9 shows the control keys of the display device used for data entry.

FIG. 9 shows some control keys 45 of the display device used for data entry according to the invention. The key 47 is used to move the pointer of the character to be entered to the left on the list 46, the key 48 is used to move to the right, key 49 down and key 50 up. Here the pointer means a mark or colour that emphasizes the character on the list. The mark can be a frame around the character, and the colour a stronger colour of the black character. The highlighted character can be entered by the key 51.

Figure 10:
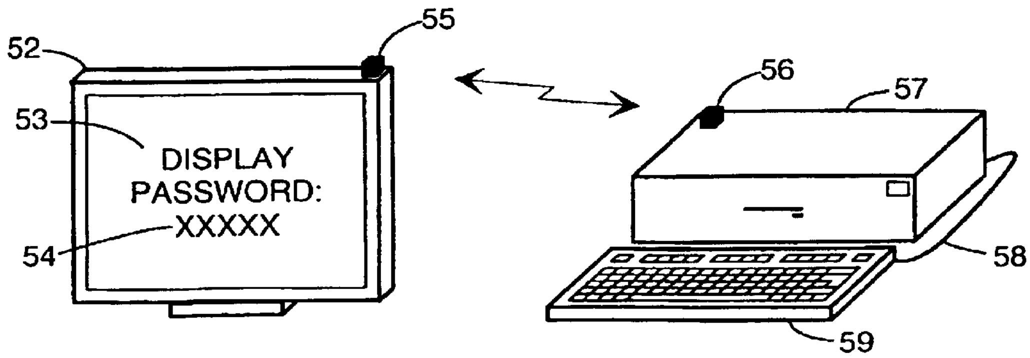
FIG. 10 shows another display device according to the invention.

FIG. 10 shows another display device 52 according to the invention, the password request 53, a covered password 54 and a special wireless connection 55 of this solution. The wireless connection of the display device 52 comprises at least a receiver for a wireless connection, but possibly also a transmitter. The display device 52 is connected by a wireless link from its connection 55 to the corresponding connection 56 of the processor unit 57. Furthermore, a keyboard 59 is connected by a connection cable 58 to the processor unit 57 for using the processor unit 57. In this application, the detachment of the device 57 controlling the display device 52 also refers to switching off the wireless link 55, 56. The operation of the connection unit 21 of the processor unit is carried out by the wireless link 55 for instance so that when the program of the connection 55 detects that the flow of information has stopped, the connection controller lets the switching device, such as a relay, open, whereby the effect is the same as when the connection cable 23 is detached.

In the following, the detachment of the cable of the display device from the processor unit for moving the equipment is examined by way of example. The time limit for the prevention mode is 30 minutes here. A longer period of time can be implemented by feeding the operating voltage of a battery, accumulator, solar cell or a large capacitor to the timer circuit. The time limit can be set with the same method as the password entry, for example. A long time is used for moving the equipment, whereby the display device is switched to the prevention mode. A password derived from the serial number of the display device is used, which password is calculated from the last 8 digits of the serial number, for example. The password is also 8 digits long and known by an authorized user. In the case of this example, the user enters the password by browsing the letters with the up or down arrow keys and confirming the selection of the character by moving to another point with the left or right arrow key and stopping the entry by moving to the "carry out" selection.

The entry of the correct password puts the user to the next level of processing safety information, at which the level of protection for the use prevention is selected and the identification data are entered. The protection level can be selected from the following: no protection, equipment protection, showing identification information or both equipment protection and showing identification information. The identification information include 38 characters, which show, for example, the name, address and/or identification code of the owner or the name and inventory number of the company.

When the display device is switched on again after the prevention mode has been activated, it operates in one of the following ways, for example:

1. When the protection level is "no protection", the display device operates as normally.

2. When the protection level is "equipment protection", the operation of the display device is prevented, but a password is requested on the display.

3. When the protection level is "show identification information", the operation of the display device is otherwise allowed, but information about the owner of the device is shown on the display during use. This information can only be hidden by the entry of the user's password. Thus it is not possible to use a stolen display device without seeing the name and address or other identification data of the real owner of the device. This at least prevents unauthorized resale of the stolen device, because the password is only available to authorized representatives, and the owner of the stolen device can easily be found for returning the equipment.

4. When the protection level is "device protection and showing identification information", the operation of the display device is otherwise prevented, but information about the owner of the device is shown on the display.

Furthermore, the identification data can be presented on the control window of the display device, even if the use of the display device were allowed. The control window means the area of the display screen which is used to regulate the image characteristics, such as its location, size, bending, colour temperature and possibly also lightness and contrast.

The protection level can be set to the initial value in production when the display device is manufactured. Then the selection can be, for example: examination of the detachment of the connector of the control cable of the display device, showing the owner's identification information and the period after which the prevention mode is activated, preferably in minutes.

The saving and change of the identification data can be carried out by a method which saves the first information, for example so that the first one or two savings are left in the non-volatile memory, where this original information can always be retrieved by an authorized service company. Thus the original owner can be found i spite of solving the password and changing the identification information later. However, the later savings are overwritten when the next identification information is saved. It should also be noted that the legal owner can also change the identification information, whereby only the first information of the owner remain in the non-volatile memory.

The memory element which saves the period of time during which the display device is detached from the processor unit can also be used for measuring the period of time during which the equipment is detached from the mains supply.

Furthermore, the memory element can be used for measuring the activity of the acceleration transducer which indicates the moving of the display device for detecting unauthorised moving of the stolen product and for limiting its use.

Here processor unit means a device which produces the information to be shown to the display device. Here the data network adaptor which connects the display device to the actual processor unit is also regarded as a part of the processor unit, if the display device is not connected directly to the central processing unit.

The invention is not limited to the embodiments described above by way of example, but many modifications are possible without departing from the scope of the inventive idea defined by the claims.

What is claimed is:

1. A method for limiting the use of a display device, which is detached from equipment which controls the display device, characterized by detecting detachment of the display device and measuring a period of time during which the display device is detached, for limiting the use of the display device after a certain predetermined time limit is exceeded.

2. A method according to claim 1, characterized in that the time limit of the period of detachment is adjustable.

3. A method comprising the steps of:

detecting detachment of a display device from the equipment which controls the display device, measuring a period of time during which the display device is detached, if said period of time is shorter than or equal to a certain predetermined time limit allowing use of the display device, and if said period of time is longer than the certain predetermined time limit preventing the use of the display device and requesting a password.

4. A method according to claim 3, wherein the password is entered using the display device.

5. A method according to claim 3, wherein the password is entered from keys of the display device.

6. A method according to claim 3, wherein the step of preventing the use of the display device is carried out by various levels of protection, which comprise any one or more types of protection as follows:

allowing use, preventing use and requesting a password, allowing use, but showing identification information during use, and preventing use and also showing identification information.

7. An arrangement for limiting the use of a display device, which display device is detached from equipment controlling the display device, characterized in that it comprises a detachment detector for detecting whether the display device is detached from the equipment controlling the display device and for measuring the period of time when the device is detached and means for limiting the use of the display device on the basis of a certain predetermined time limit.

8. An arrangement according to claim 7, characterized in that it includes:

a connection cable and a connector for the display device, in the equipment for controlling the display device a connector for the connection cable of the display device, in which connector the wires used for checking the detachment of the display device are grounded.

9. An arrangement according to claim 8, characterized in that said connector in the equipment controlling the display device is a VGA connector and the wires used for checking the detachment are a test wire and a ground wire.

10. An arrangement according to claim 7, characterized in that the detachment detector comprises:

a switch for controlling the filling status of a memory element, and said memory element for determining the period of detachment of the display device based on the filling status of the memory element.

11. An arrangement according to claim 7, characterized in that the detachment detector comprises:

a circuit for reacting to detachment of the connection cable, a memory capacitor as a memory element, and a diode for switching a charging voltage to the capacitor.

12. An arrangement according to claim 11, characterized in that the circuit reacting to the detachment of the connection cable comprises:

a switching transistor for discharging the memory capacitor, and a second capacitor for saving the status of control of the switching transistor, and a pull-up resistor and a diode for controlling the switching transistor.

13. An arrangement according to claim 12, characterized in that the pull-up resistor is an adjustable resistor for adjusting the RC time constant.

14. An arrangement according to claim 7, characterized in that the equipment controlling the display device comprise a computer processor unit.

15. An arrangement according to claim 7, characterized in that said arrangement comprises means for detecting the presence of a network.

16. An arrangement according to claim 15, characterized in that if said means for detecting the presence of the network recognize the detachment of the display device from the network for a certain time limit a password is requested.

17. An arrangement according to claim 16, characterized in that the password is entered from the network.

18. A display device, which is detached from equipment controlling the display device and which comprises means for limiting the use of the display device, characterized in that the display device comprises:

connecting means for connecting the display device to the equipment controlling the display device, a detector circuit for detecting a detachment of the processor unit, means for controlling a prevention mode in response to a signal provided by the detachment detector circuit, means for receiving a password, and a non-volatile memory for saving said password.

19. A display device according to claim 18, characterized in that the means for connecting the display device to the equipment controlling the display device comprise a connector and a cable.

20. A display device according to claim 18, characterized in that the means for connecting the display device and the equipment controlling the display device comprises a wireless link connecting means.

21. A display device according to claim 18, characterized in that it also comprises control keys for entering a password.

22. A display device according to claim 18, characterized in that the use of the display device can be limited by one or more levels of protection, which include:

allowing use, preventing use and requesting a password, allowing use, but showing identification information during use, and preventing use and also showing identification information.

23. A display device according to claim 18, characterized in that the non-volatile memory has a special area for the first information which remain permanent and another area for information which can be changed later.

* * * * *

UNITED STATES PATENT AND TRADEMARK OFFICE

CERTIFICATE OF CORRECTION

PATENT NO. : 6,816,974 B1 Page 1 of 1
DATED : November 9, 2004
INVENTOR(S) : Juha Nurmi, Kimmo Siitari and Pertti Saarinen It is certified that error appears in the above-identified patent and that said Letters Patent is hereby corrected as shown below:

<u>Title page</u>,
Item [57], ABSTRACT,
Line 3, "(b31)" should be -- (31) --.

Signed and Sealed this

Twenty-second Day of February, 2005

JON W. DUDAS
*Director of the United States Patent and Trademark Office*